United States Patent [19]

Franaszek et al.

[11] Patent Number: 5,345,228
[45] Date of Patent: Sep. 6, 1994

[54] VERY LARGE SCALE MODULAR SWITCH

[75] Inventors: Peter A. Franaszek, Katonah; Christos J. Georgiou, White Plains, both of N.Y.

[73] Assignee: International Business Machines Corporation, Armonk, N.Y.

[21] Appl. No.: 785,730

[22] Filed: Oct. 31, 1991

[51] Int. Cl.⁵ .................................. H04Q 1/00
[52] U.S. Cl. ..................... 340/825.79; 370/58.3
[58] Field of Search ............ 340/825.79, 825.8, 826; 370/58.1, 58.3; 379/284, 292, 306

[56] References Cited

U.S. PATENT DOCUMENTS

| | | | |
|---|---|---|---|
| 3,974,343 | 8/1976 | Cheney et al. | 379/244 |
| 4,421,955 | 12/1983 | Mori et al. | 379/284 |
| 4,630,045 | 12/1986 | Georgiou | 340/825.79 |
| 4,635,250 | 1/1987 | Georgiou | 379/306 |
| 4,685,100 | 8/1987 | Coppens et al. | 370/58.3 |
| 4,752,777 | 6/1988 | Franaszek | 340/825.79 |
| 5,072,217 | 12/1991 | Georgiou et al. | 340/825.79 |

Primary Examiner—Donald J. Yusko
Assistant Examiner—Edwin C. Holloway, III
Attorney, Agent, or Firm—Ronald L. Drumheller

[57] ABSTRACT

Switch resources for a one-sided crosspoint switch with distributed control (i.e., switch ports, internal busses and controllers) have been organized so that modular growth is facilitated by: (1) assigning each switch port uniquely to one of the controllers; (2) making each controller handle only the crosspoints connected to the switch ports assigned to it; (3) assigning each internal bus uniquely to one of the controllers; and (4) providing a network for the controllers to communicate with each other.

10 Claims, 4 Drawing Sheets

VERY LARGE SCALE MODULAR SWITCH

BACKGROUND OF THE INVENTION

1. Field of the Invention

This invention relates generally to crosspoint switches and more specifically to arrays of single-sided crosspoint switching elements with distributed control, particularly such arrays which can be modularly increased in size and are fault tolerant.

2. Prior Art

There is a need for very large switching systems, i.e., systems with hundreds or even thousands or ports, that can be used, for example, to interconnect processors to memories in highly parallel machines or processors to their peripheral devices in computer system I/O configurations.

Various high-performance switching fabrics have been described in the prior art for use as switching systems for computer applications. Distributed control of a crosspoint switch is described by L. D. Amdahl et al. in U.S. Pat. No. 3,226,688, entitled "MODULAR COMPUTER SYSTEM". It is also described by P. A. Franaszek in U.S. Pat. No. 4,752,777, entitled "DELTA NETWORK OF A CROSS-POINT SWITCH", and in U.S. Pat. No. 4,814,762, entitled "DELTA NETWORK CONTROL OF A CROSS-POINT SWITCH." However, all these patents describe two-sided crosspoint switches. One-sided crosspoint switches are inherently more complicated to control, since they have twice the number of crosspoint elements for a particular number of ports and also have internal busses (unlike two-sided crosspoint switches). Each interconnection of two ports through a one-sided crosspoint switch requires the setting of two crosspoint elements and there are numerous possibilities for each interconnection (one for each internal bus). All this makes one-sided crosspoint switches inherently much more flexible, but at the same time makes one-sided crosspoint switches more expensive and more difficult and unobvious how best to control, especially if distributed control is desired.

An important consideration for the design of very large switching systems is the performance of the controller. A switch with a single controller can service a large number of requests by using parallel pipeline techniques, as described by C. J. Georgiou in U.S. Pat. No. 4,630,045, entitled "CONTROLLER FOR A CROSS-POINT SWITCHING MATRIX." But as the size of the switching matrix grows, the worst-case waiting time for servicing requests also grows linearly with the number of ports, and may become unacceptably long.

For example, in a 60-port switch with a single controller, such as the IBM ESCON Director switching system described in the paper "The ESCON Director: A Dynamic Switch for 200 Mb/s Fiber-Optic Links," by C. J. Georgiou, et al, IBM Journal of Research and Development (October 1991), the worst-case waiting time is of the order of 12 microseconds. This is not significant in the current I/O environment that assumes a network with a 3 kilometer radius, because the signal propagation delay in the optical fibers (5 microseconds/kilometer) would dominate the network delay (i.e., 30 microseconds for a 3 kilometer round-trip transmission). But if the size of the switching system were to grow to 1000 ports, the worst-case waiting delay could become 220 microseconds, which would seriously affect system performance.

In U.S. Pat. No. 4,605,928, entitled "FAULT-TOLERANT ARRAY OF CROSS-POINT SWITCHING MATRICES", C. J. Georgiou describes a one-sided crosspoint matrix switch that is used to provide fault-tolerance and expandability to the switching system, but only one controller is used. In U.S. Pat. No. 4,929,940, entitled "COLLISION CROSSBAR SWITCH", Franaszek et al. describe a self-routing crosspoint matrix switch which avoids the need for determining in advance whether the desired output port is available for connection or is already connected to another port. This facilitates distribution of crosspoint control throughout the switching system, but what is specifically described is a two-sided crosspoint switch rather than a one-sided crosspoint switch. Furthermore, if too many collisions occur, performance of the switch suffers. It is not clear that in a situation where controller performance is a limiting factor (and especially in the case of a one-sided crosspoint switch) that collision frequency will not be unacceptable.

In a co-pending patent application, Ser. No. 429,674, U.S. Pat. No. 5,072,217, entitled "ONE-SIDED CROSSPOINT SWITCH WITH DISTRIBUTED CONTROL", by C. J. Georgiou and A. Varma, a switching system is described that uses multiple controllers to reduce the worst-case waiting time. A distinct group of internal busses is associated with each controller, which also controls all of the crosspoint switching elements connected to the group of busses associated with that controller. However, port status information is shared and commonly accessed, which may become a bottleneck point in large switching configurations, even if the port status information is distributed in some way among the controllers, which may significantly affect the overall system performance. Furthermore, interconnection possibilities are distributed among the controllers for handling responsibility. As a consequence, each controller must monitor all of the connection requests in order to determine which ones are to be handled by that controller. As the size of the switch gets ever larger, this monitoring task becomes impractical to implement with efficiency and turns into a bottleneck function.

Another major consideration in computer input/output (I/O) switch design is upgradability. For example, a user may initially want to install a 250-port switching system which, later, may need to be upgraded to 1000 ports. It would be advantageous to have a switch that could be readily field-upgraded to higher capacity. Similarly, it would be very advantageous for the switch manufacturer to have a design that could be easily mapped to switches of various sizes. In the aforementioned co-pending patent application, some modularity is apparent, but it is not clear that an additional column of crosspoint chips could be added easily, for example, without adding an additional controller or doing some rewiring, or that the failure of a controller will not also result in the loss of all of the internal busses controlled entirely by that failed controller.

SUMMARY OF THE INVENTION

It is an object of this invention to provide an improved large scale single-sided crosspoint matrix switch having a distributed control function which is completely modular and easily increased in capacity without stressing the performance of any of its components.

It is also an object of this invention to provide such a switch in which the number of switch ports can be increased without requiring each controller to have increased function (i.e., capability to serve an increased number of ports).

A further object of this invention is to provide such a switch in which the number of switch ports can be increased without requiring each controller to monitor all connection requests in the system.

Still another object of this invention is to provide such a switch in which the number of switch ports can be increased without requiring additional status requests to some central table.

Another object of this invention is provide such a large scale crosspoint switch which is fault tolerant.

These and further objects and features are provided by this invention by making each of the switch resources (i.e., switch ports, internal busses and controllers) modular in design and by: (1) assigning each switch port uniquely to one of the controllers; (2) making each controller handle only the crosspoints connected to the switch ports assigned to it; (3) assigning each internal bus uniquely to one of the controllers; and (4) providing a means for the controllers to communicate with each other.

Modular growth of any of the switch resources (i.e., switch ports, internal busses and/or controllers) is accommodated by effectively reallocating (i.e., modifying the assignment of) some or all of the resources. Failure of a switch resource is accommodated also by effectively reallocating (i.e., modifying the assignment of) some or all of the remaining usable resources. It is contemplated that modification of resource allocation can be done in various alternative ways, either physically or electronically, including automatically and even dynamically.

DESCRIPTION OF THE PREFERRED EMBODIMENT

The preferred embodiment is a structure that provides a highly modular switching architecture which is especially suited, but not limited, to backend, serial-I/O-type networks. This architecture eliminates the performance and expandability limitations of prior art approaches. It establishes a full-duplex connection between two ports in a large switching system.

Switch ports are viewed as shared resources for which conflicts may arise when two or more source ports need to connect to the same destination port simultaneously. Such a conflict is not resolved by means of a centralized controller or a commonly accessed table that serializes all requests as has been done in the prior art. Instead, if multiple ports receive connection requests for the same destination port, the resulting conflict is resolved by the destination port. To do so, each source port sends a connection request to the destination port, and receives either a positive response, indicating that the connection can be made, or a negative response. To avoid data-transmission conflicts, in the event that the destination port is already connected, two separate networks are used. A control transmission network is used for the exchange of connection-request messages, and a transport network is used For the transmission of data messages. Controllers assigned to each port or to groups of ports resolve destination conflicts, and carry out the interport communication function. Switch resources, such as ports, connection-status tables, and data-transport network busses (i.e., internal busses) are partitioned among the controllers. A method For establishing connections is also provided, that can be implemented in one of the following two ways:

1. The source-port controller sends a request for the desired port, while reserving the source port and the forward and return paths to the destination port. An acknowledgement (ACK) from the destination-port controller means that the connection to the destination port can be established. This approach makes the return portion of the control network particularly simple.

2. The source-port controller sends a request for the desired port while reserving the source port and the Forward path to the destination port. A response message from the destination-port controller allocates the destination port and return path. This approach offers higher flexibility in allocating the internal connection paths of the data-transport network.

Figure 1:
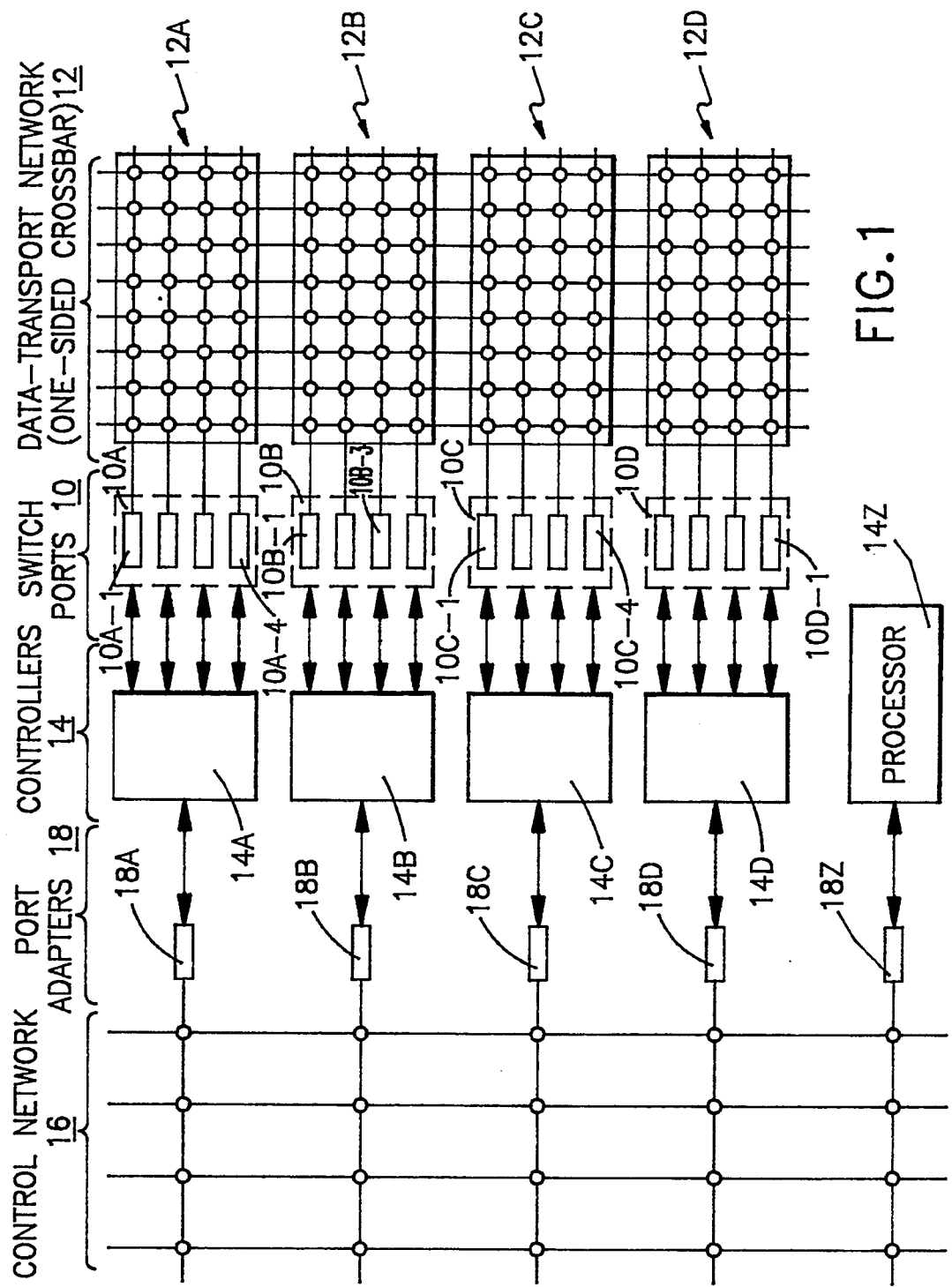
FIG. 1 is a partially functional and partially physical representation of a preferred embodiment of a crosspoint switch in accordance with this invention.

A preferred switch implementation based on these principles is shown in FIG. 1. I/O ports 10 carry out interface functions such as optoelectronic conversions, buffering, and command decoding (e.g., commands for connection/disconnection). A data-stream received over fiber-optic links (not shown) is routed from a source port (e.g., port 10A-1) to a destination port (e.g., port 10C-3) via a data-transport network 12. The data-transport network 12 operates at the same bandwidth as the bandwidth of the fiber-optic links. It is organized as a one-sided matrix switch implemented as an array of modular units 12A–12D and can operate either in a non-blocking or blocking configuration. U.S. Pat. No. 4,635,250, entitled "FULL-DUPLEX, ONE-SIDED CROSS-POINT SWITCH", by C. J. Georgiou describes the structure of one-sided matrix switches, and is hereby fully incorporated by reference.

The switch is partitioned in groups of ports, each such group 10A–10D being serviced by the corresponding one of the controllers 14A–14D. The data-transport crossbar 12 is partitioned horizontally also, so that a particular controller can set only the crosspoints that correspond (i.e., are directly connected) to its group of ports. If a connection request is made for an interconnection between two ports serviced by the same controller (i.e., ports in the same port group), the controller proceeds to establish the connection. If, on the other hand, the requested connection is to a destination port in another port group serviced by another controller, the controller servicing the source port must communicate with the controller servicing the destination port to determine if the connection can be made (i.e., determine if the destination port is Free). The number of ports in a group may vary depending on system performance requirements (e.g., the allowable worst-case queueing delay).

Communication between controllers is done over a communication or control network 16 via port adapters 18. Communication network 16 may be a contention crossbar as shown in FIG. 1. Other types of interconnection networks could also be used as the control or communication network, such as banyan, banyan with backward threads, etc. The choice of interconnection network may depend on various design parameters, such as switching system performance, minimization of part numbers, etc.

The data-transport network 12 is a one-sided crosspoint matrix switch. Therefore, two crosspoints must be specified for making a connection. A controller must provide three addresses to the crosspoint chips: 1) The address of the crosspoint row that corresponds to the source port; 2) the address of the crosspoint row that corresponds to the destination port; and 3) the address of the crossbar column (i.e., internal vertical bus) on which the connection is to be made. Column addresses (i.e., internal busses) are allocated to (i.e., partitioned among) the controllers at initialization time. The internal busses assigned to a controller are reserved for use by that controller. The internal busses (i.e., column addresses) can be reallocated at a later time, in order to bypass failed matrix chips or controllers.

Allocation of internal busses to controllers is preferably done by another controller 14Z that supervises the operation of the system. Such a supervisory controller (i.e., control processor) is equivalent in function to the Control Processor in the IBM ESCON Director described in the article cited earlier, which is hereby incorporated by reference. Control processor 14Z can (but does not necessarily) monitor the system and can (but does not necessarily) dynamically assign internal busses. Since modification of internal bus assignments is not needed very frequently, there is no need for a protocol which will allow internal bus assignments to be changed without interrupting existing interconnections.

Control processor 14Z communicates with the other processors via the control network 16. Updated bus assignments are communicated by the control processor to the other controllers over the communication lnetwork 16.

Control processor 14Z may keep an assignment table for storing the current internal bus assignments or this information could be distributed among the other controllers. The assignment table function for the internal busses in this invention is very much like the connection status table function found in the IBM ESCON Director. The controller in the ESCON Director also is described in U.S. Pat. No. 4,630,045, which is hereby incorporated by reference. A connection status table (or port status table) may be found as well in the co-pending patent application cited earlier, which is hereby incorporated by reference as well. This co-pending patent application also describes a port address lookup table which stores interconnection request possibilites assigned to a controller. Internal busses are assigned and managed in this invention in the same fashion that interconnection request possibilities are assigned and managed in that co-pending application. Control Processor 14Z in this application and the System Support Processor 22 in that co-pending application have analogous function, the main difference lying in what is being managed.

No elaborate algorithm is needed to make internal bus assignments. A policy that equally divides the columns (i.e., internal busses) among the controllers is a simple and generally acceptable approach.

If a connection is to be made between two different switch partitions A-D, the controllers of those partitions must communicate with each other before establishing the connection. As previously discussed, there are two different methods that can be followed.

In the first method, the source-port controller allocates both the forward and return paths in the data-transport network. The source-port controller forms a message consisting of the source-port forward/return column pair, a control-bit indicating a request for connection, and CRC (Cyclic-Redundancy-Check) bits, and transmits it to the destination-port controller via the control network. The destination controller receives this information, finds out if the connection is possible and transmits back to the source controller an acknowledgment message.

Figure 2:
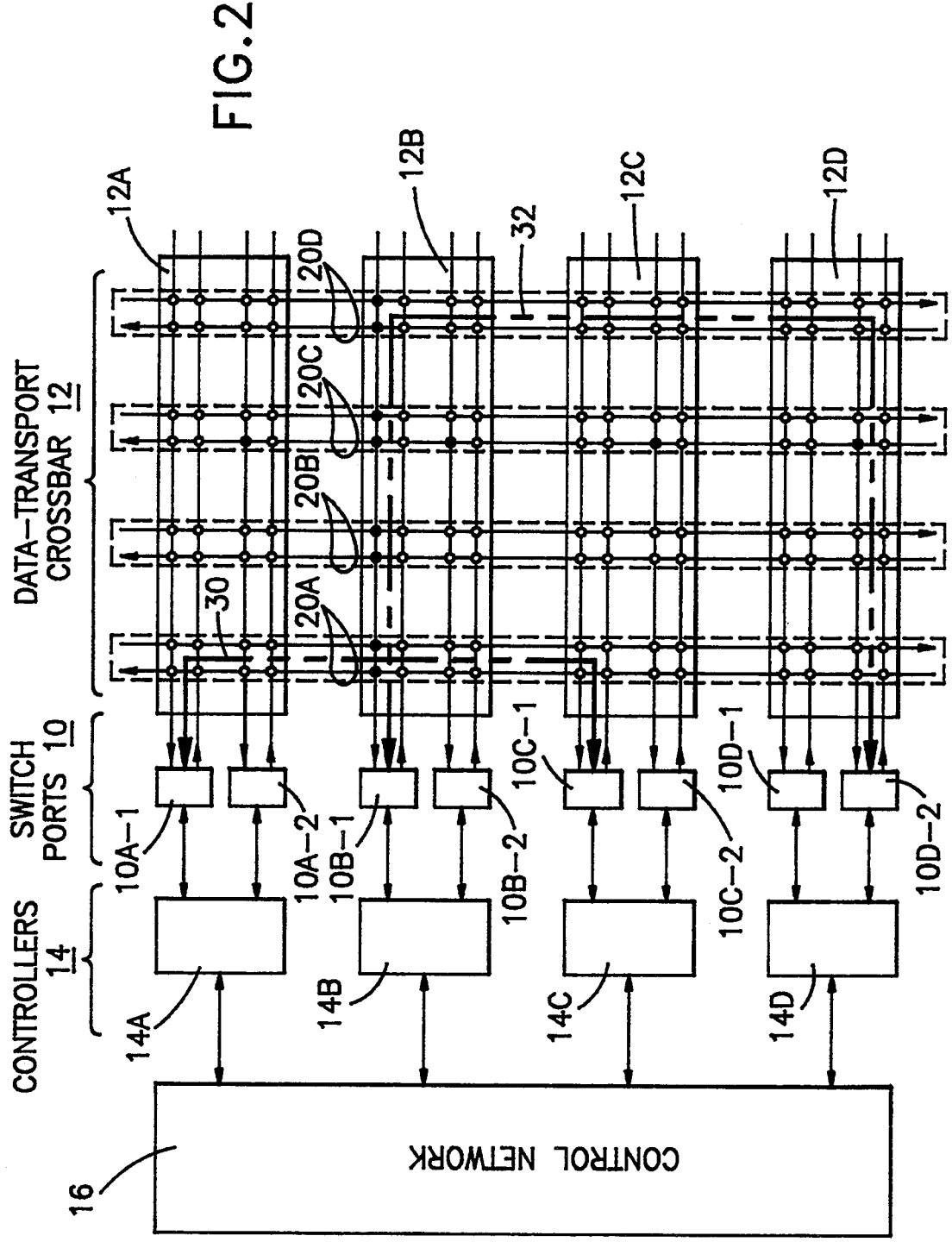
FIG. 2 is a more detailed representation of a portion of FIG. 1 illustrating interconnections made with a particular protocol.

FIG. 2 shows an example of a switching system with 8 ports (ports 10A-1 through 10D-2) divided into 4 partitions (port groups 10A through 10D), so that each controller 14A-14D services 2 ports. The columns in the data-transport crossbar are pairs of unidirectional internal busses 20A-20D. Each controller is assigned a column pair, so that controller 10A is assigned column-pair (i.e., internal busses) 20A, controller 10B is assigned column-pair 20B, and so on. Assume, for example, that port 10A-1 needs to be connected with port 10C-1. Controller 10A forms a message containing the address of source-port 10A-1, the address of destination-port 10C-1, the address of column-pair 20A, and a control bit requesting connection, and sends it to controller 10C via the control network 16. At the same time controller 10A sets two crosspoints in the data-transport crossbar to connect the horizontal bus-lines attached to port 10A-1 to the internal busses 20A.

Upon receiving the connection-request message, controller 10C examines whether port 10C-1 is already connected and, if not, it sends an acknowledgment message to controller 10A via the control network. At the same time, it sets two crosspoints in the data-transport crossbar to connect the horizontal bus-lines attached to port 10C-1 to the internal busses 20A. This concludes the establishment of the connection and data-frames can be transmitted between the two ports. This interconnection is shown in FIG. 2 as a heavy hi-directional path 30. FIG. 2 also shows an interconnection between ports 10B-1 and 14D-2 as path 32. It should be apparent that this interconnection 32 was formed by controller 14D because it utilizes the internal-busses 20D which have been assigned for use by controller 14D.

Both source and destination ports monitor the transmitted data-frames for disconnect delimiters. Upon detection of such a delimiter, they request from their corresponding controller a disconnection. The controllers disconnect (i.e., unset) the crosspoints associated with this connection and update their activity tables (not shown), so that the ports become available for other connections.

In the second method, the source-port controller allocates the forward path and the destination-port controller the return path. The source-port controller forms a message consisting of the source-port address, the destination-port address, the address of the forward column, a control-bit indicating a request for connection, and CRC bits, and transmits it to the destination-port controller via the control network. The destination controller receives this information, finds out if the connection is possible and transmits back to the source controller the address of the return column.

Figure 3:
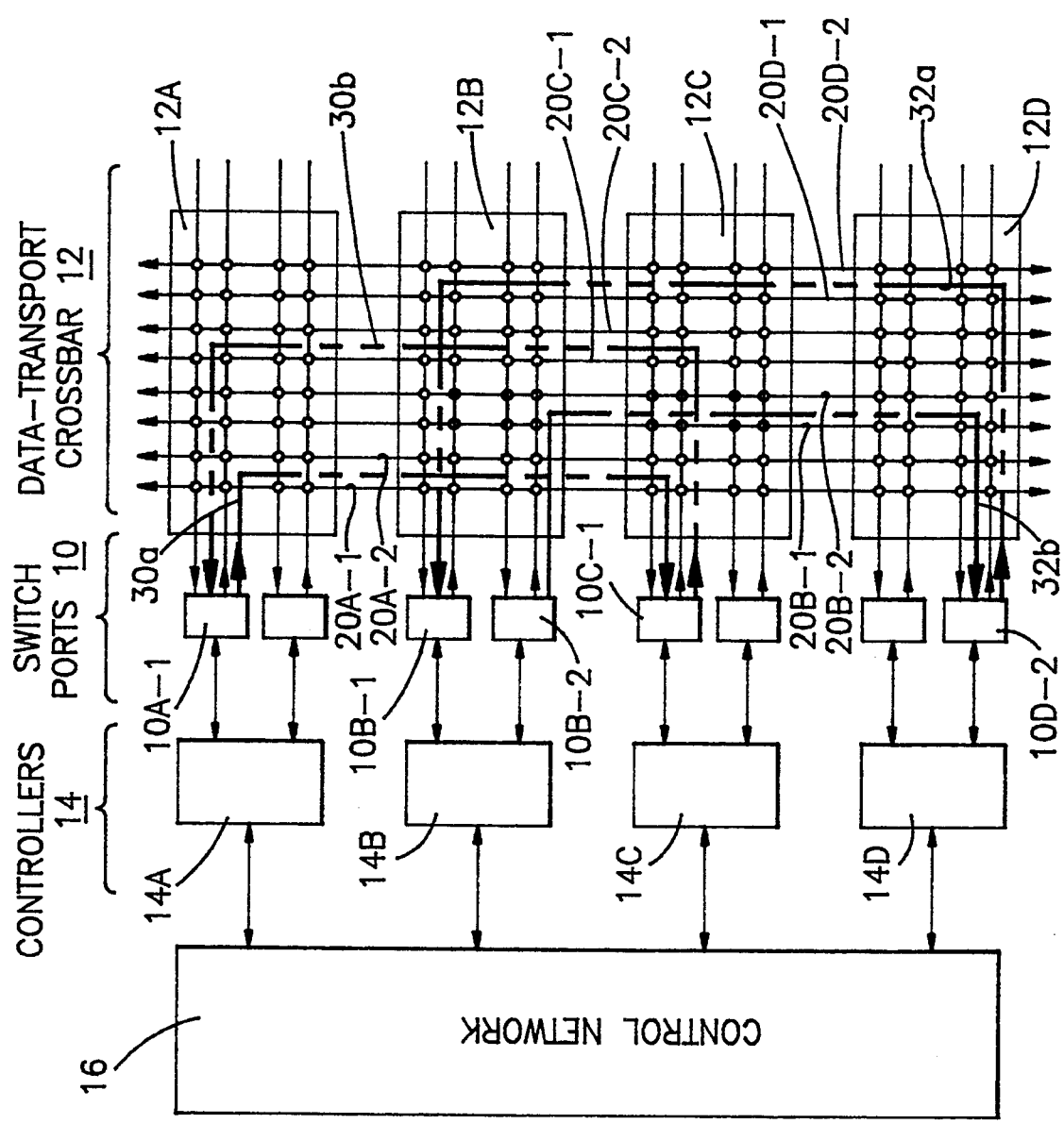
FIG. 3 is another detailed representation of the same portion shown in FIG. 2 and illustrates interconnections made with another protocol.

FIG. 3 shows another example of a switching system with 8 ports (ports 10A-1 through 10D-2) partitioned again into 4 groups 10A-10D, so that each controller 14A-14D services 2 ports. The columns in the data-transport crossbar are bidirectional internal busses. Each controller is assigned two internal busses (i.e., columns), so that controller 10A is assigned columns 20A-1 and 20A-2, controller 10B is assigned columns 20B-1 and 20B-2, and so on. Assume, for example, that port 10A-1 needs to be connected with port 10C-1. Controller 10A forms a message containing the address of source-port 10A-1, the address of destination-port 10C-1, the address of column 20A-1, and a control bit requesting connection, and sends it to controller 10C via the control network. At the same time controller 10A sets one crosspoint in the data-transport crossbar to connect the horizontal bus-lines attached to port 10A-1 to column 20A-1.

Upon receiving the connection-request message, controller 10C examines whether port 10C-1 is already connected and, if not, it sends an acknowledgement message back to controller 10A via the control network, containing the address for column 20C-1. At the same time, it sets two crosspoints in the data-transport crossbar to connect the horizontal bus-lines attached to port 10C-1 to the columns 20A-1 and 20C-1. Upon receiving the acknowledgment message, the source-port controller sets the crosspoint which connects the receiving line of port 10A-1 to the return column 20C-1. This concludes the establishment of the connection and data-frames can be transmitted between the two ports. This interconnection is shown in FIG. 3 as paths 30a and 30b, which correspond with the interconnection 30 made in FIG. 2. FIG. 3 also shows an interconnection 32a and 32b, which correspond with the interconnection 32 made in FIG. 2. Disconnection takes place as described in the first method.

If the number of bidirectional columns equals the number of ports in each partition, a non-blocking switch can be configured with only N columns. Thus, the second method requires only the minimum number columns, for non-blocking operation, but at the expense of additional protocol steps, and potential connection set-up delays.

Figure 4:
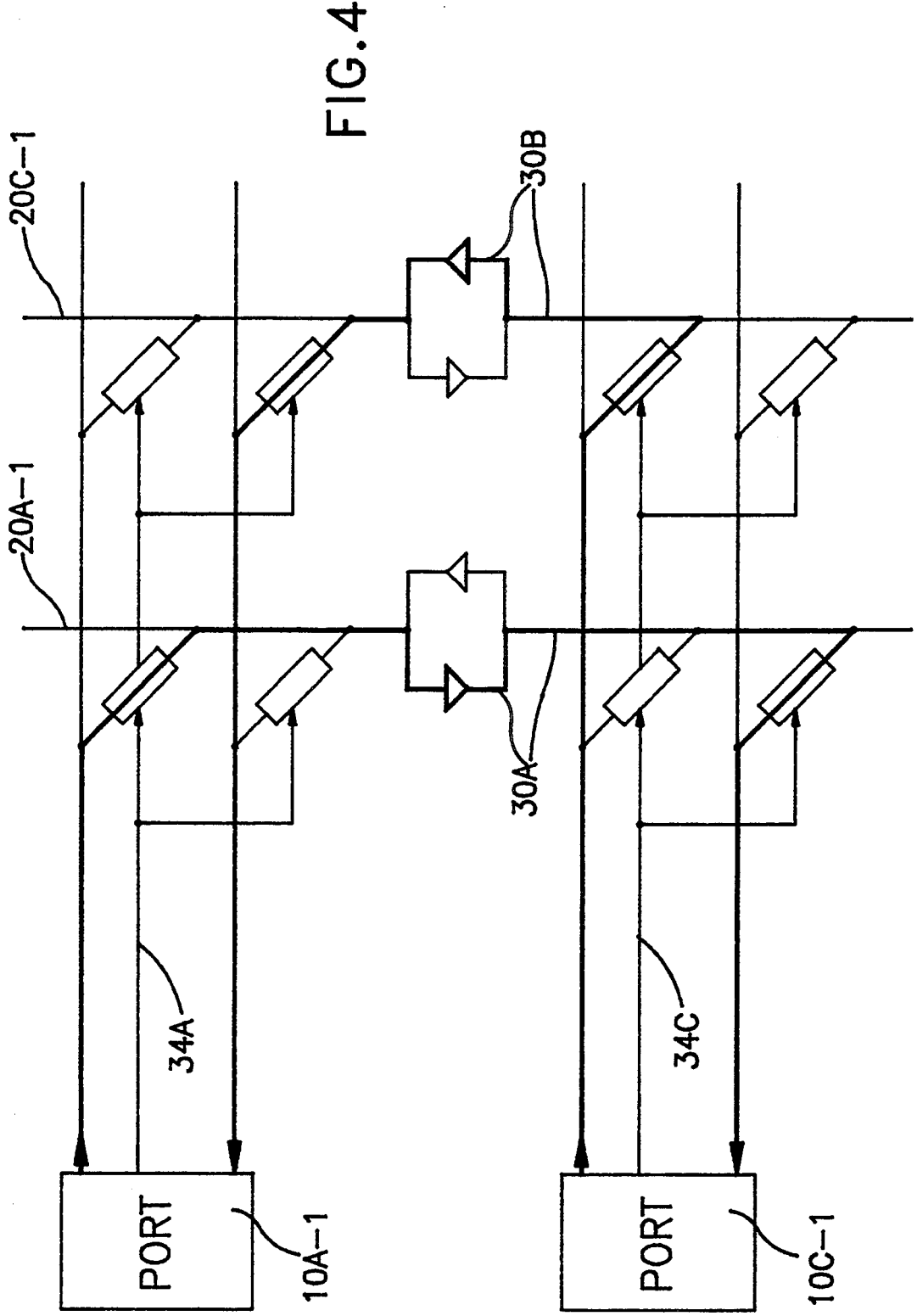
FIG. 4 illustrates a preferred implementation of the crosspoints using transfer gates.

FIG. 4 shows the interconnection 30a and 30b made in FIG. 3 and illustrates a preferred implementation of the crosspoints using transfer gates. Control lines 34A originate from controller 10A (not shown) and are used to set or switch the crosspoints under the control of controller 10A. Control lines 34C originate from controller 10C and are used to set or switch the crosspoints under the control of controller 10C. Internal bus amplifiers are also shown.

We claim:

1. A one-sided crosspoint switch for making simultaneous electrical interconnections among a plurality of ports in response to interconnection requests, comprising:

a plurality of ports partitioned into N groups of ports;

a plurality of N controllers, each of said controllers servicing a distinct one of said groups of ports by responding to interconnection requests therefrom;

a plurality of internal busses partitioned into N groups of internal busses, a distinct one of said groups of internal busses being assigned for use by each of said controllers;

a plurality of crosspoint switching elements, a distinct one of said crosspoint switching elements connecting each one of said ports with each one of said internal busses for making a selective electrical interconnection between said connected one port and said connected one internal bus;

means for each of said controllers to control a distinct group of said crosspoint switching elements, said distinct group of crosspoint switching elements controlled by said each controller being all of said crosspoint switching elements that are connected to a port in said group of ports serviced by said each controller; and a communication system interconnecting said controllers;

a first one of said controllers responding to a request for interconnection of a first one of said ports serviced by said first controller with a second one of said ports serviced by a second one of said controllers by sending a message over said communication system to said second controller, whereby said controllers can simultaneously process and implement a plurality of interconnection requests.

2. A crosspoint switch as defined in claim 1 wherein said request for interconnection is partially handled by said second controller in response to said message from said first controller by determining whether said second port is available for interconnection, and in the event said second port is available, switching a crosspoint element controlled by said second controller.

3. A crosspoint switch as defined in claim 2 wherein said request for interconnection is a request for a duplex interconnection, which is partially handled by said second controller by switching two crosspoint elements controlled by said second controller.

4. A crosspoint switch as defined in claim 2 wherein said crosspoint element switched by said second controller is fully specified in said message sent to said second controller by said first controller.

5. A crosspoint switch as defined in claim 2 wherein said crosspoint element switched by said second controller is determined by said second controller.

6. A crosspoint switch as defined in claim 1 wherein said first controller responds to said request for interconnection by switching a crosspoint element which interconnects said first port with an internal bus in said group of internal busses assigned to said first controller.

7. A crosspoint switch as defined in claim 1 wherein said message identifies said second port and identifies an internal bus for use in making said interconnection.

8. A crosspoint switch as defined in claim 7 wherein said message further identifies said first port.

9. A crosspoint switch as defined in claim 1 wherein said second controller sends a reply message to said first controller in the event said second port is not available for interconnection.

10. A crosspoint switch as defined in claim 9 wherein said reply message is sent on said communication system.

* * * * *